United States Patent
Messick, Jr.

(10) Patent No.: US 9,475,642 B2
(45) Date of Patent: Oct. 25, 2016

(54) VARIABLE SPACED CONVEYOR BELT WITH CLINCHED ROD ENDS

(71) Applicant: CAMBRIDGE INTERNATIONAL INC., Cambridge, MD (US)

(72) Inventor: George Howard Messick, Jr., Cambridge, MD (US)

(73) Assignee: CAMBRIDGE INTERNATIONAL INC., Cambridge, MD (US)

(*) Notice: Subject to any disclaimer, the term of this patent is extended or adjusted under 35 U.S.C. 154(b) by 0 days.

(21) Appl. No.: 14/537,415

(22) Filed: Nov. 10, 2014

(65) Prior Publication Data

US 2015/0129395 A1 May 14, 2015

Related U.S. Application Data

(60) Provisional application No. 61/901,827, filed on Nov. 8, 2013.

(51) Int. Cl.
 *B65G 23/06* (2006.01)
 *B65G 17/08* (2006.01)
 *B65G 15/54* (2006.01)

(52) U.S. Cl.
 CPC ............. *B65G 17/083* (2013.01); *B65G 15/54* (2013.01); *B65G 23/06* (2013.01)

(58) Field of Classification Search
 CPC .... B65G 17/08; B65G 15/54; B65G 17/083; B65G 23/06
 See application file for complete search history.

(56) References Cited

U.S. PATENT DOCUMENTS

| | | | | |
|---|---|---|---|---|
| 1,354,553 A | * | 10/1920 | Harter | B65G 17/08 198/690.2 |
| 1,772,423 A | * | 8/1930 | Hurxthal | B65G 15/48 198/853 |
| 2,619,306 A | | 11/1952 | Van Lake et al. | |
| 6,202,833 B1 | * | 3/2001 | Greer | B65G 15/54 198/848 |

(Continued)

FOREIGN PATENT DOCUMENTS

| EP | 1770028 A1 | 4/2007 |
|---|---|---|
| EP | 2220396 A1 | 8/2010 |

OTHER PUBLICATIONS

European Search Report dated Mar. 19, 2015 for corresponding Application No. 14192573.5.

*Primary Examiner* — Thomas Randazzo
(74) *Attorney, Agent, or Firm* — Buchanan, Ingersoll & Rooney PC

(57) ABSTRACT

A flat wire conveyor belt and system includes a plurality of spaced tractive rods and a plurality of rows of pickets transversely disposed with respect to a direction of travel and interconnecting the plurality of spaced tractive rods, each of the rows of pickets including a plurality of first links and a plurality of second links, the plurality of first links have a first spacing and the plurality of second links have a second spacing, the first spacing being less than the second spacing. The system further includes a sprocket, wherein the plurality of spaced tractive rods terminate with clinched ends within the plurality of first links disposed on the outer edges of the flat wire conveyor belt, and the first links are dimensioned for receiving the clinched ends and the sprocket teeth therewithin.

8 Claims, 4 Drawing Sheets

(56) References Cited

U.S. PATENT DOCUMENTS

| | | | | |
|---|---|---|---|---|
| 6,854,590 B2 * | 2/2005 | Rudy | ................ | B26D 7/20 |
| | | | | 198/690.2 |
| 7,721,877 B2 * | 5/2010 | Maine, Jr. | ............. | B65G 17/08 |
| | | | | 198/848 |
| 7,975,840 B2 * | 7/2011 | Messick, Jr. | ........... | B65G 17/08 |
| | | | | 198/834 |
| 8,506,687 B2 * | 8/2013 | Jones | ................. | B03C 3/45 |
| | | | | 55/290 |
| D712,158 S * | 9/2014 | Messick, Jr. | ................ | D5/2 |
| 2009/0078544 A1 | 3/2009 | Messick, Jr. et al. | | |
| 2010/0269699 A1 | 10/2010 | Jones | | |

* cited by examiner

VARIABLE SPACED CONVEYOR BELT WITH CLINCHED ROD ENDS

TECHNICAL FIELD

The disclosure herein is directed to a conveyor belt, more particularly to a flat wire conveyor belt having variable spaced wire links, and still more particularly, to a flat wire conveyor belt system having variable spaced wire links and clinched ends on the interconnecting rods.

BACKGROUND

Flat wire conveyor belts have been in the market for many years. Flat wire conveyor belts are generally low maintenance and when positively driven with sprockets have little to no lateral shifting. With reference to FIG. 1, U.S. Pat. No. 2,619,306 discloses a flat wire conveyor belt 10 comprising a plurality of pickets 16, sometimes also referred to as wickets, and interconnecting rods 18 about which the pickets hinge. The rods 18 terminate on the side edges of the belt 10 in a small button head 19. The pickets 16 on belt 10 support the product to be conveyed and the rods 18 are utilized to hold the components of belt 10 together.

In a straight run, when a sprocket tooth is disposed within an opening defined by a link in the picket, the sprocket tooth relieves the tension in the adjacent pickets and concentrates it one location, thereby causing rod 18 to deflect at the sprocket tooth. This in turn causes the link in the picket which surrounds the sprocket tooth to become more highly loaded. Hence, fatigue and breakage may occur at one or more of the link areas surrounding a sprocket tooth where rod 18 meets picket 16.

Fatigue breakage at one or more of the picket areas of a flat wire conveyor belt is a function of the number of cycles that a particular area is flexed. This problem becomes even more pronounced as the conveyor belt becomes lighter in weight and more open due to efforts to reduce manufacturing costs and the resultant reduction in material usage.

A conveyor belt 100 as shown generally in FIG. 2 comprises a flat wire conveyor belt including a plurality of spaced tractive rods 180 disposed in succession and transversely with respect to a direction of travel T as represented by arrow T of belt 100, each rod 180 having two button head ends 182 and 184.

Belt 100 includes a plurality of rows of pickets 160 transversely disposed with respect to the direction of travel T, and interconnecting the succession of rods 180. Each row of pickets 160 is comprised of a plurality of links 105, each link connecting a rod 180 with a following rod in the succession.

Pickets 160 comprise a plurality of links 105; however, not all the links 105 within a single picket are identical. More particularly, in order to strengthen the outer edges of the conveyor belt, the edges of the picket are provided with links 110 having a first spacing or mesh size and the middle portion of the belt therebetween is provided with links 120 having a second spacing or mesh size. The exact number of links 110 or mesh openings on each end of the picket may vary depending upon the weight of the belt and other conditions. By way of example, picket 160 shown in FIG. 2 includes two links 110 defining four open mesh areas on each end of the picket for cooperation with a dual tooth sprocket. Hence, the pattern of openings in belt 100 provides both narrow openings for sprocket engagement and wider openings for product support that results in reduced material usage and belt weight, yet still provides sufficient strength for product support. Such a conveyor belt is know from U.S. Pat. No. 7,975,840, assigned to Cambridge International, Inc., the entire contents of which are hereby incorporated by reference.

The use of button head ends 182 and 184 on the rod 180, however, requires increased manufacturing costs and does not produce the desired finished appearance to the rod ends.

Accordingly, there exists a need in the marketplace for a flat wire conveyor belt having a lighter weight and reduced quantity of required material, while still retaining its strength so as to avoid fatigue failure, and which provides an aesthetically pleasing finished edge on the belt.

SUMMARY

The disclosure herein is directed to a variable spaced conveyor belt and system including a plurality of spaced tractive rods and a plurality of rows of pickets transversely disposed with respect to a direction of travel and interconnecting the plurality of spaced tractive rods. Each of the rows of pickets includes a plurality of first links and a plurality of second links, the plurality of first links having a first spacing and the plurality of second links having a second spacing. The system further includes a sprocket, wherein the plurality of spaced tractive rods terminate with clinched ends within the plurality of first links disposed on the outer edges of the flat wire conveyor belt, and the first links are dimensioned for receiving the clinched ends and the sprocket teeth therewithin.

BRIEF DESCRIPTION OF THE DRAWING FIGURES

The disclosure herein will become more readily apparent to those skilled in the art upon reading the following detailed description, in conjunction with the appended drawings in which.

DETAILED DESCRIPTION OF THE PREFERRED EMBODIMENTS

Figure 1:
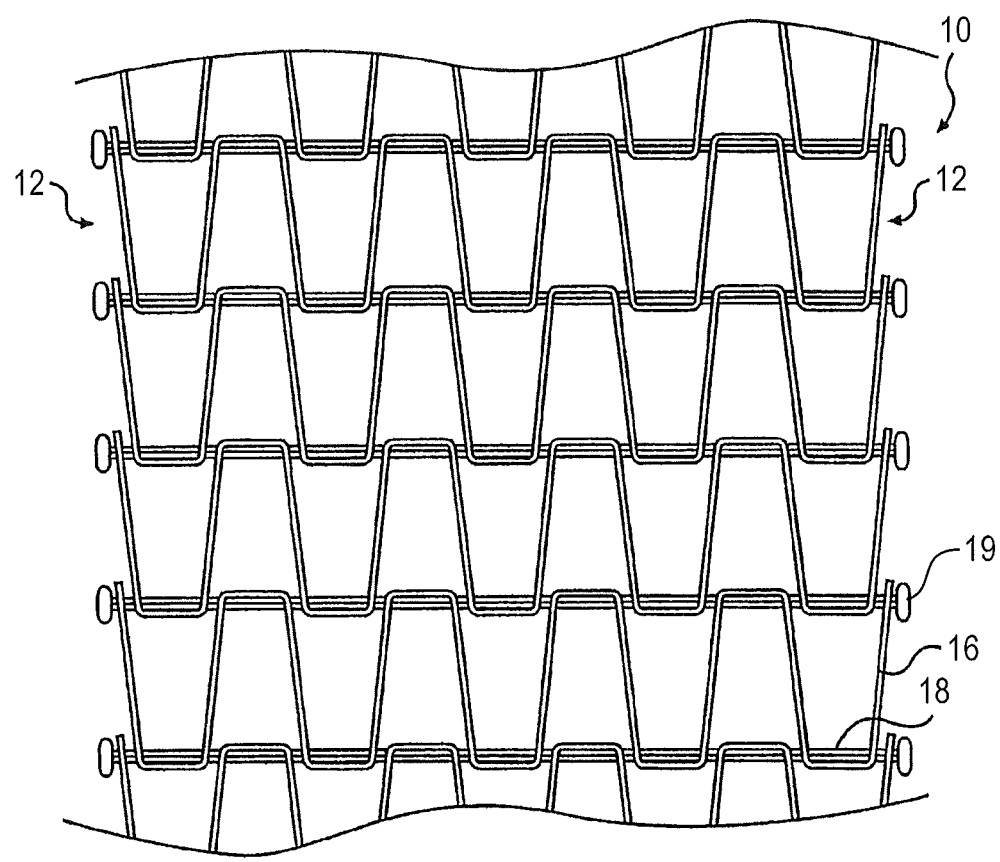
FIG. 1 is a top elevational view of a segment of a conventional flat-wire conveyor belt.
Figure 2:
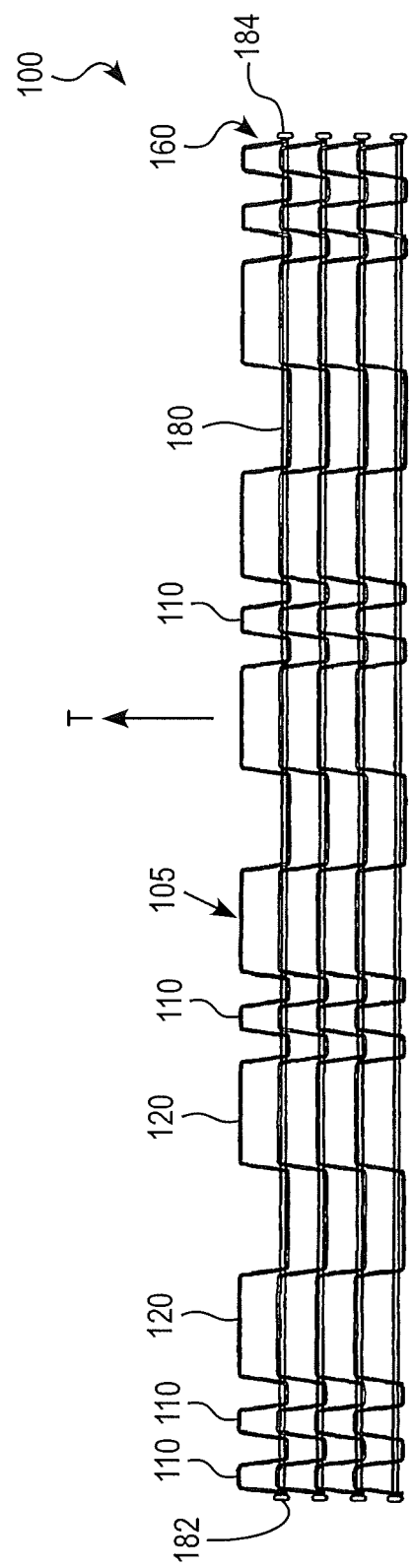
FIG. 2 is a top elevational view of a known variable spaced flat-wire conveyor belt.
Figure 3:
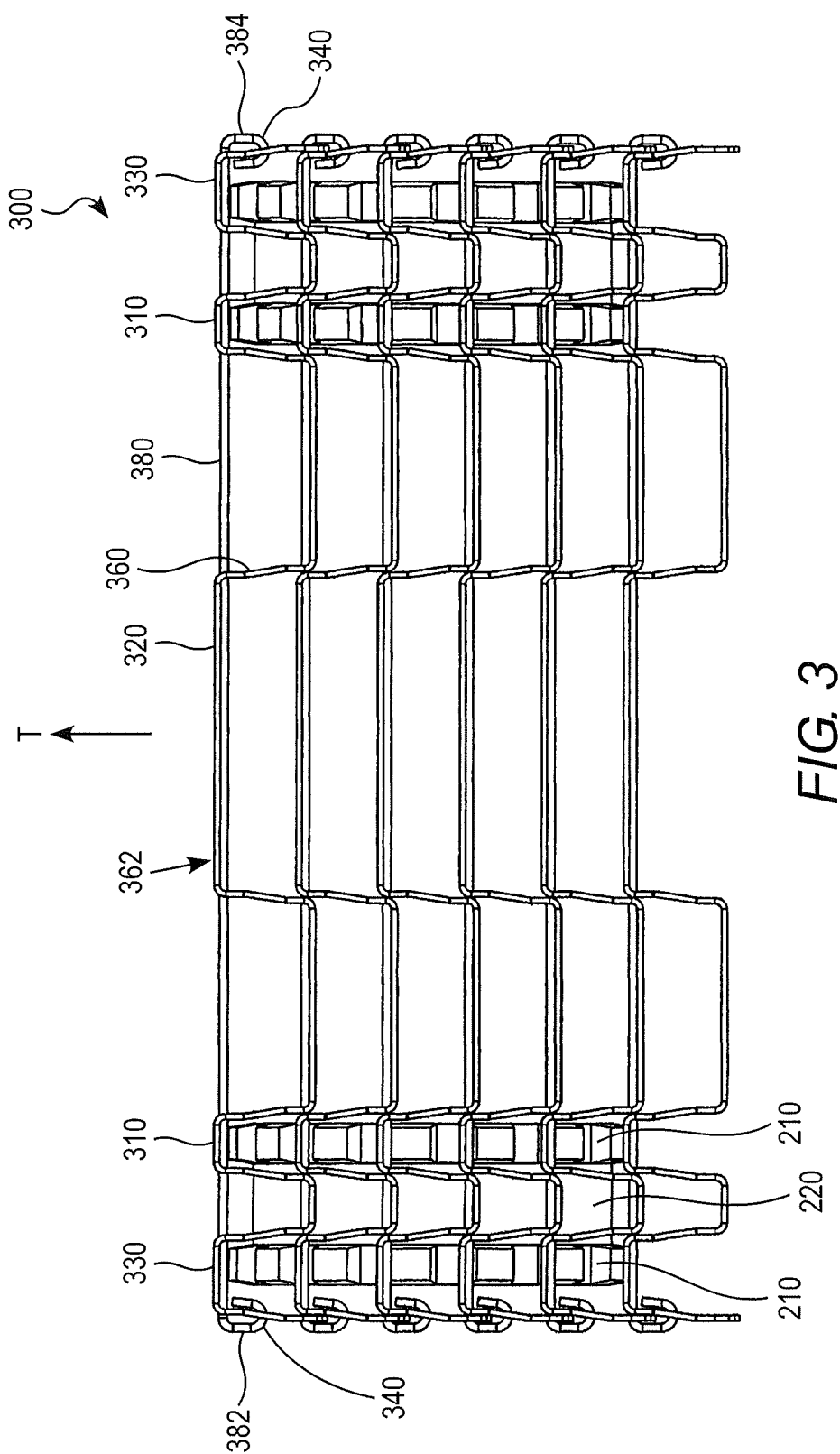
FIG. 3 is a top elevational view of a variable spaced flat wire conveyor belt according to an exemplary embodiment of the disclosure.

A conveyor belt in accordance with an exemplary embodiment of the disclosure is shown generally in FIG. 3 by reference numeral 300. Conveyor belt 300 preferably comprises a flat wire conveyor belt including a plurality of spaced tractive rods 380 disposed in succession and transversely with respect to a direction of travel T as represented by arrow T of belt 300, each rod 380 having two clinched ends 382, 384, as described in greater detail below.

Belt 300 includes a plurality of rows of pickets 360 transversely disposed with respect to the direction of travel T, and interconnecting the succession of rods 380. Each row of pickets 360 is comprised of a plurality of links 362, each link connecting a rod 380 with a following rod in the succession.

Figure 4:
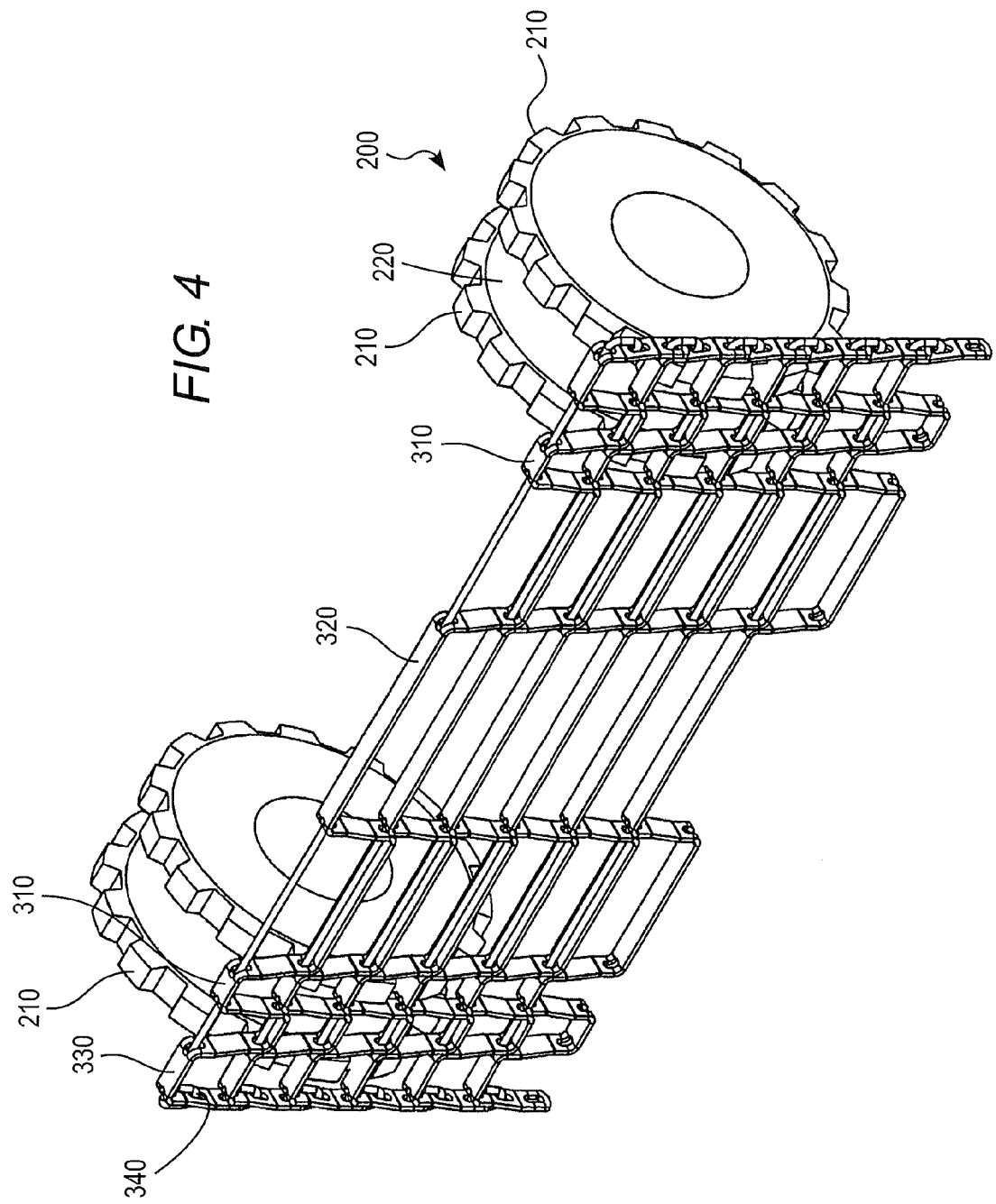
FIG. 4 is a perspective view of a dual tooth sprocket and an exemplary embodiment of the flat wire conveyor belt of the disclosure.

In accordance with the illustrated exemplary embodiment of the disclosure, pickets 360 comprise a plurality of links 362; however, not all the links 362 within a single picket are identical. More particularly, in order to strengthen the outer edges of the conveyor belt, the edges of the picket are provided with links (first links) 310 having a first spacing or mesh size and the middle portion of the belt therebetween is provided with links (second links) 320 having a second spacing or mesh size. The exact number of links 310 or mesh openings on each end of the picket may vary depending upon the weight of the belt and other conditions. By way of example, picket 360 shown in FIG. 3 includes an inner edge link 310 and an outermost edge link 330 that together define three open mesh areas on each end thereof for cooperation with a dual tooth sprocket, as shown in FIG. 4 and discussed further below. Picket 360 could be configured however to be used with a single tooth sprocket.

As will be appreciated by one skilled in the art, the spacing of the links 310 is less than the spacing of the links 320 such that the edges of the conveyor belt are reinforced by being more dense, heavier, and stronger. By spacing the links in the middle portion further apart, the weight of the picket is reduced and thus, the overall weight and material need for the conveyor belt are reduced. One skilled in the art will recognize that spacing patterns other than the illustrated exemplary embodiment could be used to even further reduce the weight of the belt.

In addition, as shown in FIG. 3, rather than terminating on the outside of the outermost links 330, the connecting rods 380 are bent around to define a U-shape termination resulting in a clinched end 382, 384 on each end. The outermost link 330 thus includes an opening 340 on the outermost leg which allows the connecting rod 380 to extend therethrough, and bend towards the direction of travel T (upwards as shown in FIG. 3), to thereby define the U-shaped end 382, 384.

Referring to FIG. 4, a sprocket 200 in accordance with an exemplary embodiment of the disclosure is shown. Sprocket 200 is a dual tooth sprocket in that each outer peripheral edge includes a row of sprocket teeth 210, with a smooth supporting surface 220 disposed therebetween. The ability to use a double tooth sprocket allows the belt to be more evenly loaded across the width and the narrow links 310, 330 permit there to be less deflection at the drive engagement points. While a dual tooth sprocket is preferred, one skilled in the art will appreciate that two narrow sprockets with a single row of teeth could also be used to engage the narrow links 330 of the belt 300. As illustrated, the sprocket teeth 210 engage the open areas defined by links 310, 330 of the conveyor belt 300, while the supporting surface 220 supports the open area disposed therebetween.

Due to the clinched end configuration, the openings of the outermost links 330 on each belt edge are extended in width, relative to links 310, to provide clearance for the clinched rod ends 382, 384, while at the same time allowing proper engagement with the sprocket teeth 210, but without interference or contact between the sprocket 200 and rod ends 382, 384. The openings of interior edge links 310 within the belt that are intended for sprocket engagement are sized to match the width of the sprocket teeth 210 with some amount of additional minimal clearance. More particularly, sprocket openings 310 that engage the second row of sprocket teeth 210 is of the proper width to restrict the belt 300 from moving laterally and thus causing the sprocket teeth 210 within sprocket openings 330 from contacting the clinched rod ends 382, 384 in openings 330. Hence, the installation and setup of the belt and sprockets is significantly simplified. This also provides locations across the width of the belt 300 where the belt tension can be properly transferred to the drive sprockets 200 in a manner which results in the least amount of deformation of the belt components, but also provides a means to sufficiently restrain the belt from excessive side-to-side movement.

Thus, the width of the sprocket openings of links 330 is sized so as to allow proper engagement with the sprockets, but also restrict lateral movement of the belt that would cause the sprockets on the outer edges to interfere with the finished clinched edges 382, 384 of the belt connecting rods 380 during operation.

In accordance with the disclosure, the number and spacing of the sprocket engagement points can be varied depending upon the application and desired product loads.

The above-described exemplary embodiment of the disclosure illustrates preferred relationships between links within a picket configured for use with a dual tooth sprocket. Such descriptions are not limited to the illustrated lineal pitch, and can of course be used with any desired pitch. Similarly, the pickets and hence the conveyor belts can be manufactured to any preferred width depending upon the desired application.

While the present invention has been described with respect to a particular exemplary embodiment of the disclosure herein, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A variable spaced flat wire conveyor belt system comprising:
   a plurality of spaced tractive rods;
   a plurality of rows of flat wire wickets transversely disposed with respect to a direction of travel and interconnecting said plurality of spaced tractive rods, each said wicket having a uniform thickness dimension throughout a width of the conveyor belt; each of said row of wickets defining a plurality of edge links and a plurality of middle links, each of said links having a longitudinal height and a transverse spacing; and
   at least one dual tooth sprocket having a plurality of sprocket teeth;
   wherein said plurality of edge links have a first height and a first transverse spacing and said plurality of middle links have a second height and a second transverse spacing, said first height being substantially equal to said second height and said first spacing being less than said second spacing, and
   wherein said conveyor belt includes an opposing first outer edge and a second outer edge and said plurality of edge links are disposed on the first outer edge and the second outer edge of the flat wire conveyor belt,
   wherein one of said plurality of edge links disposed on an outermost first edge and one of said plurality of edge links disposed on an outermost second edge of the flat wire conveyor belt have a longitudinal height substantially equal to said first height of said plurality of edge links and a transverse spacing less than said first transverse spacing of a remainder of said edge links;
   wherein said plurality of spaced tractive rods terminate with clinched ends within said one of said plurality of edge links disposed on the outermost first edge and the outermost second edge of the flat wire conveyor belt, and
   wherein said one of the edge links on the outermost first edge and said one of the edge links disposed on the outermost second edge are dimensioned for receiving said clinched ends and said sprocket teeth therewithin and the remainder of said edge links are dimensioned for receiving only said sprocket teeth therewithin such that said ones of said plurality of edge links disposed on the outermost first edge and the outermost second edge have a greater width than the remainder of said edge links.

2. The variable spaced flat wire conveyor belt system according to claim 1, wherein said one of said plurality of edge links disposed on the outermost first edge and said one of said plurality of edge links disposed on the second outer edge include a rod opening on an outermost leg of said ones of said plurality of edge links, a terminal end of said spaced tractive rod extending inwardly through said opening and bending towards the direction of travel such that said spaced tractive rod terminates at an interior position within said ones of said edge links.

3. The variable spaced flat wire conveyor belt system according to claim 1, wherein said clinched ends define rounded protrusions on at least the first outer edge and the second outer edge of the flat wire conveyor belt.

4. The variable spaced flat wire conveyor belt system according to claim 1, wherein said plurality of sprocket teeth on said at least one sprocket includes a first circumferential row of sprocket teeth and a second circumferential row of sprocket teeth.

5. The variable spaced flat wire conveyor belt system according to claim 4, wherein the first circumferential row of sprocket teeth engage said plurality of edge links and the second circumferential row of sprocket teeth engage said ones of said plurality of edge links, said ones of said plurality of edge links being dimensioned to restrict lateral movement of the conveyor belt and prevent the first circumferential row of sprocket teeth from contacting said clinched ends.

6. A variable spaced flat wire conveyor belt comprising:
a plurality of spaced tractive rods; and
a plurality of rows of flat wire wickets transversely disposed with respect to a direction of travel and interconnecting said plurality of spaced tractive rods, each said wicket having a uniform thickness dimension throughout a width of the conveyor belt; each of said row of wickets defining a plurality of first links and a plurality of second links, each of said links having a longitudinal height and a transverse spacing;
wherein said plurality of first links have a first height and a first transverse spacing and said plurality of second links have a second height and a second transverse spacing, said first height being substantially equal to said second height and said first spacing being less than said second spacing;
wherein said conveyor belt includes an opposing first outer edge and a second outer edge and said plurality of first links are disposed on at least the first outer edge and the second outer edge of the flat wire conveyor belt;
wherein each of said row of wickets further includes a plurality of third links spaced inwardly from said plurality of first links and outwardly of said plurality of second links, said plurality of third links having a longitudinal height substantially equal to said first height of said first links and a transverse spacing less than said first transverse spacing of said first links and less than said second transverse spacing of said second links;
wherein said plurality of spaced tractive rods terminate with clinched ends within said plurality of first links disposed on at least the first outer edge and the second outer edge of the flat wire conveyor belt; and
wherein said first links are dimensioned for receiving said clinched ends therewithin.

7. The variable spaced flat wire conveyor belt according to claim 6, wherein said first link disposed on the first outer edge and said first link disposed on the second outer edge include a rod opening on an outermost leg of said first links, a terminal end of said spaced tractive rod extending inwardly through said opening and bending towards the direction of travel such that said spaced tractive rod terminates at an interior position within said first link.

8. The variable spaced flat wire conveyor belt according to claim 6, wherein said clinched ends define rounded protrusions on at least the first outer edge and the second outer edge of the flat wire conveyor belt.

* * * * *